(12) United States Patent
Yu

(10) Patent No.: US 9,836,605 B2
(45) Date of Patent: Dec. 5, 2017

(54) SYSTEM FOR DETECTING UNAUTHORIZED CODE IN A SOFTWARE APPLICATION

(71) Applicant: BANK OF AMERICA CORPORATION, Charlotte, NC (US)

(72) Inventor: Sounil Yu, Reston, VA (US)

(73) Assignee: Bank of America Corporation, Charlotte, NC (US)

( * ) Notice: Subject to any disclaimer, the term of this patent is extended or adjusted under 35 U.S.C. 154(b) by 85 days.

(21) Appl. No.: 14/962,646

(22) Filed: Dec. 8, 2015

(65) Prior Publication Data

US 2017/0161492 A1    Jun. 8, 2017

(51) Int. Cl.
*G06F 21/56* (2013.01)
*G06F 21/52* (2013.01)

(52) U.S. Cl.
CPC ............ *G06F 21/566* (2013.01); *G06F 21/52* (2013.01); *G06F 2221/033* (2013.01); *G06F 2221/2101* (2013.01)

(58) Field of Classification Search
CPC ................................ G06F 21/566; G06F 21/52
See application file for complete search history.

(56) References Cited

U.S. PATENT DOCUMENTS

| | | | |
|---|---|---|---|
| 5,951,698 A | 9/1999 | Chen et al. | |
| 5,983,348 A | 11/1999 | Ji | |
| 6,192,512 B1 * | 2/2001 | Chess | G06F 9/455 714/38.12 |
| 6,256,773 B1 * | 7/2001 | Bowman-Amuah | G06F 8/71 707/999.202 |
| 6,405,170 B1 * | 6/2002 | Phillips | G10L 15/22 379/88.02 |
| 6,697,950 B1 | 2/2004 | Ko | |

(Continued)

OTHER PUBLICATIONS

Zeng et al.; GloMoSim: a library for parallel simulation of large-scale wireless networks; Published in: Parallel and Distributed Simulation, 1998. PADS 98. Proceedings. Twelfth Workshop on; Date of Conference: May 29-29, 1998; IEEE Xplore.*

(Continued)

*Primary Examiner* — Bradley Holder
(74) *Attorney, Agent, or Firm* — Michael A. Springs; Moore & Van Allen PLLC; Peter B. Stewart

(57) ABSTRACT

Disclosed is a computerized system for detecting unauthorized code in a software application. The system typically includes a processor, a memory, and a software analysis module stored in the memory. The system for is typically configured for: executing a software application in a development environment and in a production environment; monitoring execution of the software application in the development environment and in the production environment; comparing the execution of the software application in the development environment and the execution of the software application in the production environment; identifying a discrepancy between the execution of the software application in the development environment and the execution of the software application in the production environment; and, based on identifying the discrepancy, transmitting an alert to a user computing device. Unauthorized code associated with the discrepancy may then be removed from the software application.

25 Claims, 3 Drawing Sheets

(56) References Cited

U.S. PATENT DOCUMENTS

| | | |
|---|---|---|
| 6,851,057 B1 | 2/2005 | Nachenberg |
| 6,973,578 B1 | 12/2005 | McIchione |
| 7,058,822 B2 * | 6/2006 | Edery ................. G06F 21/52 726/22 |
| 7,069,583 B2 | 6/2006 | Yann et al. |
| 7,069,589 B2 | 6/2006 | Schmall et al. |
| 7,089,591 B1 | 8/2006 | Chi |
| 7,146,305 B2 * | 12/2006 | van der Made ...... G06F 21/566 703/22 |
| 7,287,279 B2 | 10/2007 | Bertman et al. |
| 7,370,360 B2 | 5/2008 | van der Made |
| 7,624,449 B1 | 11/2009 | Perriot |
| 7,639,714 B2 | 12/2009 | Stolfo et al. |
| 7,644,441 B2 | 1/2010 | Schmid et al. |
| 7,742,939 B1 * | 6/2010 | Pham .................. G06F 8/77 705/7.39 |
| 8,069,484 B2 | 11/2011 | McMillan et al. |
| 8,239,836 B1 * | 8/2012 | Franz ................. G06F 11/1487 717/127 |
| 8,312,545 B2 | 11/2012 | Tuvell et al. |
| 8,365,286 B2 | 1/2013 | Poston |
| 9,613,210 B1 * | 4/2017 | Wang ................. G06F 21/56 |
| 2002/0073330 A1 | 6/2002 | Chandnani et al. |
| 2005/0108562 A1 | 5/2005 | Khazan et al. |
| 2005/0114837 A1 * | 5/2005 | Blumenthal ........ G06F 11/3688 717/124 |
| 2005/0240999 A1 | 10/2005 | Rubin et al. |
| 2006/0075494 A1 | 4/2006 | Bertman et al. |
| 2007/0074169 A1 | 3/2007 | Chess et al. |
| 2014/0338004 A1 * | 11/2014 | Camiel ................ G06F 21/62 726/30 |

OTHER PUBLICATIONS

Varga et al.; An overview of the OMNeT++ simulation environment; Published in: Proceeding Simutools 2008 Proceedings of the 1st international conference on Simulation tools and techniques for communications, networks and systems & workshops Article No. 60; 2008; ACM Digital Library.*

* cited by examiner

SYSTEM FOR DETECTING UNAUTHORIZED CODE IN A SOFTWARE APPLICATION

FIELD OF THE INVENTION

The present invention embraces a system for detecting unauthorized code in a software application. The system typically includes a processor and a memory. The system also typically includes a software analysis module stored in the memory, which is typically configured for: monitoring execution of the software application in the development environment and in the production environment; identifying a discrepancy between the execution of the software application in the development environment and the execution of the software application in the production environment; and, based on identifying the discrepancy, transmitting an alert to a user computing device.

BACKGROUND

One of the problems associated with running various software applications is that such software application may include unauthorized or harmful software code. For example, a software application may include a logic bomb, which is a portion of code that is configured to perform a harmful function when defined conditions have been satisfied. By way of further example, a software application may include a backdoor, which is software code that allows normal authentication procedures to be bypassed. Accordingly, a need exists for an improved way of identifying unauthorized or harmful software code in software applications.

SUMMARY

In one aspect, the present invention embraces a computerized system for detecting unauthorized code in a software application. The system typically includes a processor and a memory. The system also typically includes a software analysis module stored in the memory and executable by the processor. In one embodiment, the software analysis module is configured for: executing the software application in a development environment; monitoring execution of the software application in the development environment; executing the software application in a production environment; monitoring execution of the software application in the production environment; based on monitoring the execution of the software application in the development environment and in the production environment, comparing the execution of the software application in the development environment and the execution of the software application in the production environment; based on comparing the execution of the software application in the development environment and the execution of the software application in the production environment, identifying a discrepancy between the execution of the software application in the development environment and the execution of the software application in the production environment; and, based on identifying the discrepancy, transmitting an alert to a user computing device.

In a particular embodiment, executing the software application in the development environment comprises performing unit testing of the software application.

In another particular embodiment, identifying the discrepancy between the execution of the software application in the development environment and the execution of the software application in the production environment comprises identifying a process that is executed in the development environment but is not executed in the production environment.

In another particular embodiment, identifying the discrepancy between the execution of the software application in the development environment and the execution of the software application in the production environment comprises identifying software code in the software application that is executed in the development environment but is not executed in the production environment.

In another particular embodiment, monitoring execution of the software application in the development environment comprises creating a development environment data flow map; monitoring execution of the software application in the production environment comprises creating a production environment data flow map; comparing the execution of the software application in the development environment and the execution of the software application in the production environment comprises comparing the production environment data flow map and the development environment data flow map; and identifying the discrepancy between the execution of the software application in the development environment and the execution of the software application in the production environment comprises identifying a discrepancy between the production environment data flow map and the development environment data flow map.

In another particular embodiment, transmitting the alert comprises presenting a graphical user interface that identifies software code associated with the discrepancy.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
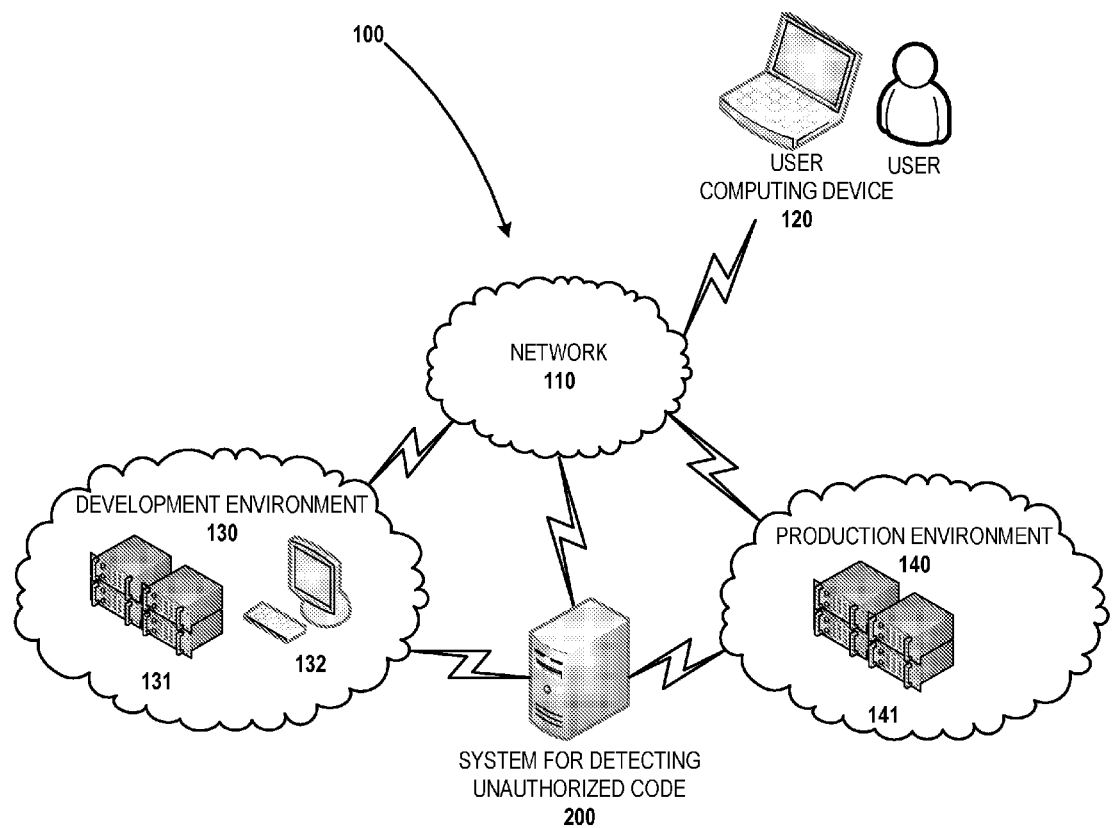
Figure 2:
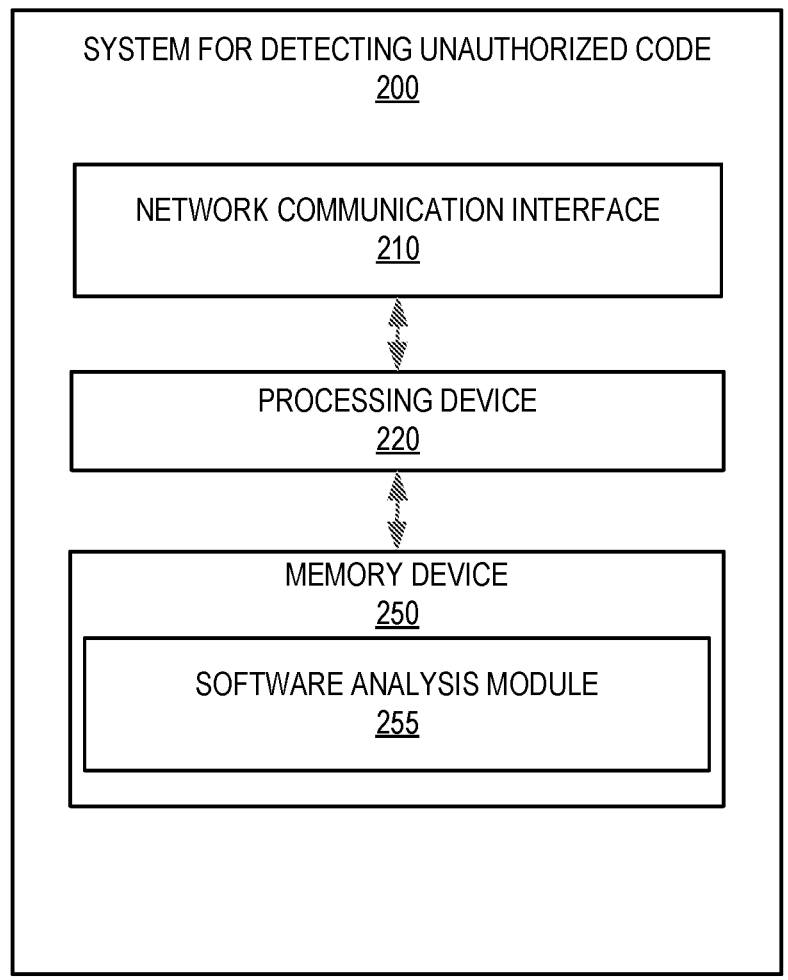
Figure 3:
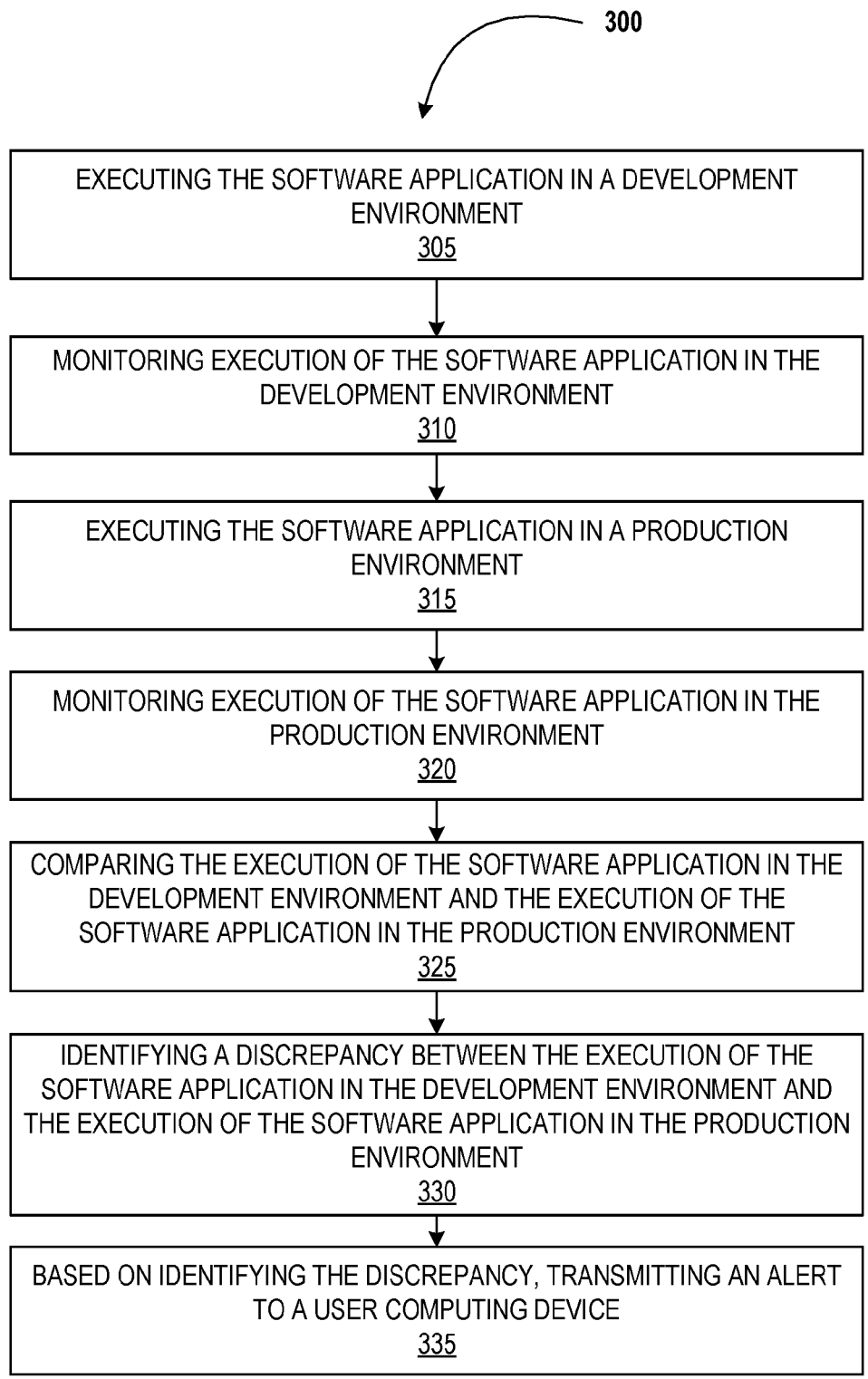

Having thus described embodiments of the invention in general terms, reference will now be made the accompanying drawings, wherein:

FIG. 1 depicts a system for detecting unauthorized code and operating environment in accordance with an exemplary embodiment of the present invention;

FIG. 2 schematically depicts a system for detecting unauthorized code in accordance with an exemplary embodiment of the present invention; and FIG. 3 depicts a method of detecting unauthorized code in a software application in accordance with an exemplary embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

An "entity" may be any person or organization implementing a system for detecting unauthorized code described herein. A "user" may be any person or entity using a system for detecting unauthorized code described herein. Often, a user is an employee of the entity.

In one aspect, the present invention embraces a system that may be used to identify unauthorized code in a software application. In this regard, the software application is executed in a development environment and in a production environment. The execution of the software application within the development environment is compared with the execution of the software application within the production environment to identify any discrepancies. For example, this comparison may identify code that is executed in the development environment, but not in the production environment. By way of further example, this comparison may identify processes of the software application that are executed in the development environment, but not in the production environment. Thereafter, an alert that identifies the discrepancy may be sent to one or more users (e.g., management personnel of the entity operating the system).

By identifying discrepancies and alerting a user of such discrepancies, the user can further analyze the software application to determine if the discrepancy is attributable to unauthorized code. Unauthorized code may be a logic bomb or a backdoor. A logic bomb is code that performs a harmful function when defined conditions have been met. A backdoor is software code that subverts normal authentication requirements and provides unauthorized access to a software application or a system. Such unauthorized code may be inserted into the software application by a developer (e.g., an employee or contractor of the entity) with the intention of later harming the entity. Such unauthorized code is typically latent and, thus, is typically not executed when the software application is initially run in a production environment. Instead, such unauthorized code may be configured to be executed as some point in the future. However, the developer that inserted the unauthorized code may create test scripts or other testing procedures to be performed in a development environment that test whether the unauthorized code executes as intended by the developer. For example, such testing may be performed during unit testing. Accordingly, by identifying code or processes that execute in a development environment but not in a production environment, potentially harmful code can be identified.

FIG. 1 depicts an operating environment 100 according to one embodiment of the present invention. As depicted in FIG. 1, the operating environment 100 typically includes a development environment 130 and a production environment 140. A development environment is a computer environment in which new software applications and updates to existing software applications may be developed. A production environment is a computer environment in which software applications are used (e.g., in real time) by end users, such an employees or customers of the entity that operates the operating environment 100. Although not depicted in FIG. 1, it is within the scope of the present invention for the operating environment 100 to include other computer environments, such as a staging environment, a testing environment (e.g., a user-acceptance testing environment), a quality assurance environment, or a back-up environment. Each computer environment includes one or more computing devices, such as a server or workstation. For example, the development environment 130 may include one or more servers 131 and one or more developer workstations 132, and the production environment 140 may include one or more servers 141.

The operating environment 100 also typically includes a system for detecting unauthorized code 200. The system 200 and each computer environment of the operating environment is typically in communication with a network 110, such as the Internet, wide area network, local area network, Bluetooth network, near field network, or any other form of contact or contactless network. One or more users, each having a user computing device 120, such as a PC, laptop, mobile phone, tablet, television, mobile device, or the like, may be in communication with the computer environments, such as the development environment 130 and the production environment 140, via the network 110. In some instances users may directly use a computing device within a computer environment. For example, an employee of the entity may use a developer workstation 132 within the development environment 130. Each user computing device 120 may also be in communication with the system 200.

FIG. 2 depicts the system for detecting unauthorized code 200 in more detail. As depicted in FIG. 2, the system for detecting unauthorized code 200 typically includes various features such as a network communication interface 210, a processing device 220, and a memory device 250. The network communication interface 210 includes a device that allows the system for detecting unauthorized code 200 to communicate with the development environment 130 and the production environment 140, and user computing devices 120 (e.g., over the network 110 (shown in FIG. 1)).

As used herein, a "processing device," such as the processing device 220, generally refers to a device or combination of devices having circuitry used for implementing the communication and/or logic functions of a particular system. For example, a processing device 220 may include a digital signal processor device, a microprocessor device, and various analog-to-digital converters, digital-to-analog converters, and other support circuits and/or combinations of the foregoing. Control and signal processing functions of the system are allocated between these processing devices (e.g., processors) according to their respective capabilities. The processing device 220 may further include functionality to operate one or more software programs based on computer-executable program code thereof, which may be stored in a memory. As the phrase is used herein, a processing device 220 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device," such as the memory device 250, generally refers to a device or combination of devices that store one or more forms of computer-readable media for storing data and/or computer-executable program code/instructions. Computer-readable media is defined in greater detail below. For example, in one embodiment, the memory device 250 includes any computer memory that provides an actual or virtual space to temporarily or permanently store data and/or commands provided to the processing device 220 when it carries out its functions described herein.

As noted, the system for detecting unauthorized code 200 is configured to identify discrepancies between the execution of a software application in the development environment 130 and the execution of the software application in the production environment 140. Accordingly, the system for detecting unauthorized code 200 typically includes one or more modules stored in the memory device 250, which facilitate detection of such discrepancies. As depicted in FIG. 2, the system 200 typically includes a software analysis module 255.

In this regard, FIG. 3 depicts a method 300 of detecting unauthorized code that may be performed by the software analysis module 255.

Initially, at block 305, a software application is executed in the development environment 130. Typically, the software application is a software application that has been developed internally by the entity operating the system 200.

Executing the software application in the development environment 130 typically includes performing unit testing of the software application. In unit testing, units of the software application's source code may be testing to ensure they work properly. Each unit tested may correspond to a particular function, method, or class within the software application's source code. The testing procedure for the unit tests are typically created by the developers of the software application as part of the development process. Because the developers typically write the unit tests, if a particular developer has inserted unauthorized code into the software application, such developer will typically create a unit test for such unauthorized code.

At block 310, the execution of the software application in the development environment 130 is monitored (e.g., monitored while the software application is being executed in the development environment 130). In some embodiments, this monitoring of the software application includes determining exactly what code and/or processes (e.g., functions, types of transactions, methods, or the like) of the software application have been executed in the development environment 130, such as during unit testing. In some embodiments, this monitoring of the software application includes creating one or more data flow maps. Each data flow map may show how data flows through the software application in the development environment. Because the software application is typically monitored as part of unit testing, a separate data flow map may be created for each unit of the software application's source code being tested.

At block 315, the software application is executed in the production environment 140. Typically, the software application is executed in the production environment 140 subsequent to executing and monitoring the software application in the development environment 130. In this regard, once the software application has been satisfactorily developed and tested, the software application may be deployed in the production environment 140 (e.g., by installing the software application on the production server 141).

At block 320, the execution of the software application in the production environment 140 is monitored (e.g., monitored while the software application is being executed in the production environment 140). In some embodiments, this monitoring of the software application includes determining exactly what code and/or processes (e.g., functions, types of transactions, methods, or the like) of the software application have been executed in the development environment 130, such as during unit testing. In some embodiments, this monitoring of the software application includes creating one or more data flow maps. Each data flow map may show how data flows through the software application in the production environment.

At block 325, based on monitoring the execution of the software application in the development environment and in the production environment, the execution of the software application in the development environment is compared with the execution of the software application in the production environment. For example, the portions of code executed in the development environment 130 may be compared with the portion of code executed in the production environment 140 to identify if any portions of code have been executed in one environment but not the other environment. By way of further example, the processes of the software application executed in the development environment 130 may be compared with the processes executed in the production environment 140 to identify if any particular processes (e.g., functions, types of transactions, methods, or the like) of the software application have been executed in one environment but not the other environment. In a particular embodiment, data flow maps generated while monitoring the execution of the software application in the development environment 130 may be compared with data flow maps generated while monitoring the execution of the software application in the production environment 140 to identify any differences in how data flows through the software application in the production environment 140 versus the development environment 130. Differences in how data flows through the software application in the production environment 140 versus the development environment 130 may be used to identify any portions of code and/or processes of the software application that have been executed in one environment but not the other environment.

Based on comparing the execution of the software application in the development environment with the execution of the software application in the production environment, at block 330, a discrepancy between the execution of the software application in the development environment and the execution of the software application in the production environment is identified. Typically, a discrepancy is a material difference in how the software application behaves in the development environment and the production environment. A material difference may be any difference that may be indicative of harmful or unauthorized code in the software application, but is typically not a minor difference caused by configuration changes or different computer systems in the development and production environments. In this regard, a discrepancy may be portions of code and/or processes of the software application that have been executed in one environment but not the other environment. A discrepancy may also be material differences in how data flows through the software application in the production environment 140 versus the development environment 130. More typically, a discrepancy is a portion of code or a process that is executed in the development environment 130 but is not executed in the production environment 140. As noted, code or processes that execute in a development environment but not in a production environment may correspond to harmful, unauthorized code (e.g., a logic bomb or backdoor) in the software application.

Based on identifying the discrepancy an alert is transmitted to a user (e.g., to a user computing device 120). The user to which the alert is transmitted may be an employee of the entity who has a management position. The alert may inform the user of the discrepancy. The alert may also identify a portion of code or a particular process of the software application that is associated with the discrepancy. For example, the alert may identify code or processes that have been executed in a development environment but not in a production environment. The alert may be a message (e.g., an email, SMS, or instant message) that is transmitted to the user computing device 120 once the discrepancy has been identified. In some embodiments, the alert may cause the user computing device 120 to display a graphical user interface that provides information regarding the discrepancy, such as by depicting a portion of code that is associated with the discrepancy. In some embodiments, instead of transmitting the alert to the user immediately upon detecting the discrepancy, the code or process associated with the discrepancy may be flagged for further analysis. Thereafter, when the user access the system 200 or a related system, the alert may be provided to the user (e.g., via a pop-up window or other notification in a graphical user interface that is provided by the system 200 to the user computing device 120). Once the user has received the alert, the user can further investigate whether code or process associated with the discrepancy corresponds to unauthorized code that has been inserted into the software application. If there is unauthorized code in the software application, such unauthorized code may then be removed.

In a particular embodiment, instead of executing the software application in a production environment and comparing this execution to execution within a development environment to identify discrepancies, the software application may be executed in an environment that is configured to resemble a production environment, such as a testing environment or a staging environment. In this regard, the software application may be tested (e.g., via user acceptance testing) in a testing environment or staging environment to determine whether the software application works properly in conditions that simulate real world scenarios. Execution in such an environment may be monitored and compared with execution of the software application in the development environment 130 to identify discrepancies as described above.

As evident from the preceding description, the system described herein represents an improvement in technology by identifying discrepancies in a software application and alerting appropriate individuals of such discrepancies. Accordingly, the system provides a technical solution for overcoming the problem of identifying unauthorized code that has been inserted into a software application. Indeed, by identifying differences in how a software application is executed in a development environment and a production environment, unauthorized code can be detected.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computerized system for detecting unauthorized code in a software application, comprising:
   a computer apparatus including a processor, a memory, and a network communication interface; and
   a software analysis module stored in the memory, executable by the processor, and configured to:
   execute the software application in a development environment, wherein executing the software application in the development environment comprises performing unit testing of the software application;
   monitor execution of the software application in the development environment;
   execute the same software application in a production environment;
   monitor execution of the software application in the production environment;
   based on monitoring the execution of the software application in the development environment and in the production environment, compare the execution of the software application in the development environment and the execution of the software application in the production environment;
   based on comparing the execution of the software application in the development environment and the execution of the software application in the production environment, identify a discrepancy between the execution of the software application in the development environment and the execution of the software application in the production environment, wherein identifying the discrepancy between the execution of the software application in the development environment and the execution of the software application in the production environment comprises (i) identifying a process that is executed in the development environment but is not executed in the production environment or (ii) identifying software code in the software application that is executed in the development environment but is not executed in the production environment; and
   based on identifying the discrepancy, transmitting an alert to a user computing device.

2. The computerized system for detecting unauthorized code in a software application according to claim 1, wherein identifying the discrepancy between the execution of the software application in the development environment and the execution of the software application in the production environment comprises identifying a process that is executed in the development environment but is not executed in the production environment.

3. The computerized system for detecting unauthorized code in a software application according to claim 1, wherein identifying the discrepancy between the execution of the software application in the development environment and the execution of the software application in the production environment comprises identifying software code in the software application that is executed in the development environment but is not executed in the production environment.

4. The computerized system for detecting unauthorized code in a software application according to claim 1, wherein:
   monitoring execution of the software application in the development environment comprises creating a development environment data flow map;
   monitoring execution of the software application in the production environment comprises creating a production environment data flow map;
   comparing the execution of the software application in the development environment and the execution of the software application in the production environment comprises comparing the production environment data flow map and the development environment data flow map; and
   identifying the discrepancy between the execution of the software application in the development environment and the execution of the software application in the production environment comprises identifying a discrepancy between the production environment data flow map and the development environment data flow map.

5. The computerized system for detecting unauthorized code in a software application according to claim 1, wherein transmitting the alert comprises presenting a graphical user interface that identifies software code associated with the discrepancy.

6. A computer program product for detecting unauthorized code in a software application embodied on a non-transitory computer-readable storage medium having computer-executable instructions for:
   executing the software application in a development environment, wherein executing the software application in the development environment comprises performing unit testing of the software application;

monitoring execution of the software application in the development environment;
executing the same software application in a production environment;
monitoring execution of the software application in the production environment;
based on monitoring the execution of the software application in the development environment and in the production environment, comparing the execution of the software application in the development environment and the execution of the software application in the production environment;
based on comparing the execution of the software application in the development environment and the execution of the software application in the production environment, identifying a discrepancy between the execution of the software application in the development environment and the execution of the software application in the production environment, wherein identifying the discrepancy between the execution of the software application in the development environment and the execution of the software application in the production environment comprises (i) identifying a process that is executed in the development environment but is not executed in the production environment or (ii) identifying software code in the software application that is executed in the development environment but is not executed in the production environment; and
based on identifying the discrepancy, transmitting an alert to a user computing device.

7. The computer program product according to claim 6, wherein identifying the discrepancy between the execution of the software application in the development environment and the execution of the software application in the production environment comprises identifying a process that is executed in the development environment but is not executed in the production environment.

8. The computer program product according to claim 6, wherein identifying the discrepancy between the execution of the software application in the development environment and the execution of the software application in the production environment comprises identifying software code in the software application that is executed in the development environment but is not executed in the production environment.

9. The computer program product according to claim 6, wherein:
monitoring execution of the software application in the development environment comprises creating a development environment data flow map;
monitoring execution of the software application in the production environment comprises creating a production environment data flow map;
comparing the execution of the software application in the development environment and the execution of the software application in the production environment comprises comparing the production environment data flow map and the development environment data flow map; and
identifying the discrepancy between the execution of the software application in the development environment and the execution of the software application in the production environment comprises identifying a discrepancy between the production environment data flow map and the development environment data flow map.

10. The computer program product according to claim 6, wherein transmitting the alert comprises presenting a graphical user interface that identifies software code associated with the discrepancy.

11. A method for detecting unauthorized code in a software application, comprising:
executing, via a computer processor, the software application in a development environment, wherein executing the software application in the development environment comprises performing unit testing of the software application;
monitoring, via a computer processor, execution of the software application in the development environment;
executing, via a computer processor, the same software application in a production environment;
monitoring, via a computer processor, execution of the software application in the production environment;
based on monitoring the execution of the software application in the development environment and in the production environment, comparing, via a computer processor, the execution of the software application in the development environment and the execution of the software application in the production environment;
based on comparing the execution of the software application in the development environment and the execution of the software application in the production environment, identifying, via a computer processor, a discrepancy between the execution of the software application in the development environment and the execution of the software application in the production environment, wherein identifying the discrepancy between the execution of the software application in the development environment and the execution of the software application in the production environment comprises (i) identifying a process that is executed in the development environment but is not executed in the production environment or (ii) identifying software code in the software application that is executed in the development environment but is not executed in the production environment; and
based on identifying the discrepancy, transmitting, via a computer processor, an alert to a user computing device.

12. The method according to claim 11, wherein identifying the discrepancy between the execution of the software application in the development environment and the execution of the software application in the production environment comprises identifying a process that is executed in the development environment but is not executed in the production environment.

13. The method according to claim 11, wherein identifying the discrepancy between the execution of the software application in the development environment and the execution of the software application in the production environment comprises identifying software code in the software application that is executed in the development environment but is not executed in the production environment.

14. The method according to claim 11, wherein:
monitoring execution of the software application in the development environment comprises creating a development environment data flow map;
monitoring execution of the software application in the production environment comprises creating a production environment data flow map;
comparing the execution of the software application in the development environment and the execution of the software application in the production environment comprises comparing the production environment data flow map and the development environment data flow map; and identifying the discrepancy between the execution of the software application in the development environment and the execution of the software application in the production environment comprises identifying a discrepancy between the production environment data flow map and the development environment data flow map.

15. The method according to claim 11, wherein transmitting the alert comprises presenting a graphical user interface that identifies software code associated with the discrepancy.

16. A computerized system for detecting unauthorized code in a software application, comprising:
- a computer apparatus including a processor, a memory, and a network communication interface; and
- a software analysis module stored in the memory, executable by the processor, and configured to:
  execute the software application in a development environment;
  monitor execution of the software application in the development environment, wherein monitoring execution of the software application in the development environment comprises creating a development environment data flow map;
  execute the same software application in a production environment;
  monitor execution of the software application in the production environment, wherein monitoring execution of the software application in the production environment comprises creating a production environment data flow map;
  based on monitoring the execution of the software application in the development environment and in the production environment, compare the execution of the software application in the development environment and the execution of the software application in the production environment, wherein comparing the execution of the software application in the development environment and the execution of the software application in the production environment comprises comparing the production environment data flow map and the development environment data flow map;
  based on comparing the execution of the software application in the development environment and the execution of the software application in the production environment, identify a discrepancy between the execution of the software application in the development environment and the execution of the software application in the production environment, wherein identifying the discrepancy between the execution of the software application in the development environment and the execution of the software application in the production environment comprises identifying a discrepancy between the production environment data flow map and the development environment data flow map; and
  based on identifying the discrepancy, transmitting an alert to a user computing device.

17. The computerized system for detecting unauthorized code in a software application according to claim 16, wherein executing the software application in the development environment comprises performing unit testing of the software application.

18. The computerized system for detecting unauthorized code in a software application according to claim 16, wherein identifying the discrepancy between the execution of the software application in the development environment and the execution of the software application in the production environment comprises identifying a process that is executed in the development environment but is not executed in the production environment.

19. The computerized system for detecting unauthorized code in a software application according to claim 16, wherein identifying the discrepancy between the execution of the software application in the development environment and the execution of the software application in the production environment comprises identifying software code in the software application that is executed in the development environment but is not executed in the production environment.

20. The computerized system for detecting unauthorized code in a software application according to claim 16, wherein transmitting the alert comprises presenting a graphical user interface that identifies software code associated with the discrepancy.

21. A method for detecting unauthorized code in a software application, comprising:
  executing, via a computer processor, the software application in a development environment;
  monitoring, via a computer processor, execution of the software application in the development environment, wherein monitoring execution of the software application in the development environment comprises creating a development environment data flow map;
  executing, via a computer processor, the same software application in a production environment;
  monitoring, via a computer processor, execution of the software application in the production environment, wherein monitoring execution of the software application in the production environment comprises creating a production environment data flow map;
  based on monitoring the execution of the software application in the development environment and in the production environment, comparing, via a computer processor, the execution of the software application in the development environment and the execution of the software application in the production environment, wherein comparing the execution of the software application in the development environment and the execution of the software application in the production environment comprises comparing the production environment data flow map and the development environment data flow map;
  based on comparing the execution of the software application in the development environment and the execution of the software application in the production environment, identifying, via a computer processor, a discrepancy between the execution of the software application in the development environment and the execution of the software application in the production environment, wherein identifying the discrepancy between the execution of the software application in the development environment and the execution of the software application in the production environment comprises identifying a discrepancy between the production environment data flow map and the development environment data flow map; and
  based on identifying the discrepancy, transmitting, via a computer processor, an alert to a user computing device.

22. The method according to claim 21, wherein executing the software application in the development environment comprises performing unit testing of the software application.

23. The method according to claim 21, wherein identifying the discrepancy between the execution of the software application in the development environment and the execution of the software application in the production environment comprises identifying a process that is executed in the development environment but is not executed in the production environment.

24. The method according to claim 21, wherein identifying the discrepancy between the execution of the software application in the development environment and the execution of the software application in the production environment comprises identifying software code in the software application that is executed in the development environment but is not executed in the production environment.

25. The method according to claim 21, wherein transmitting the alert comprises presenting a graphical user interface that identifies software code associated with the discrepancy.

* * * * *